Sept. 1, 1953
C. E. TIBBALS
2,650,627
SPLINE AFFIXING DEVICE FOR PARQUETRY BLOCKS
Filed Jan. 31, 1950
5 Sheets-Sheet 1
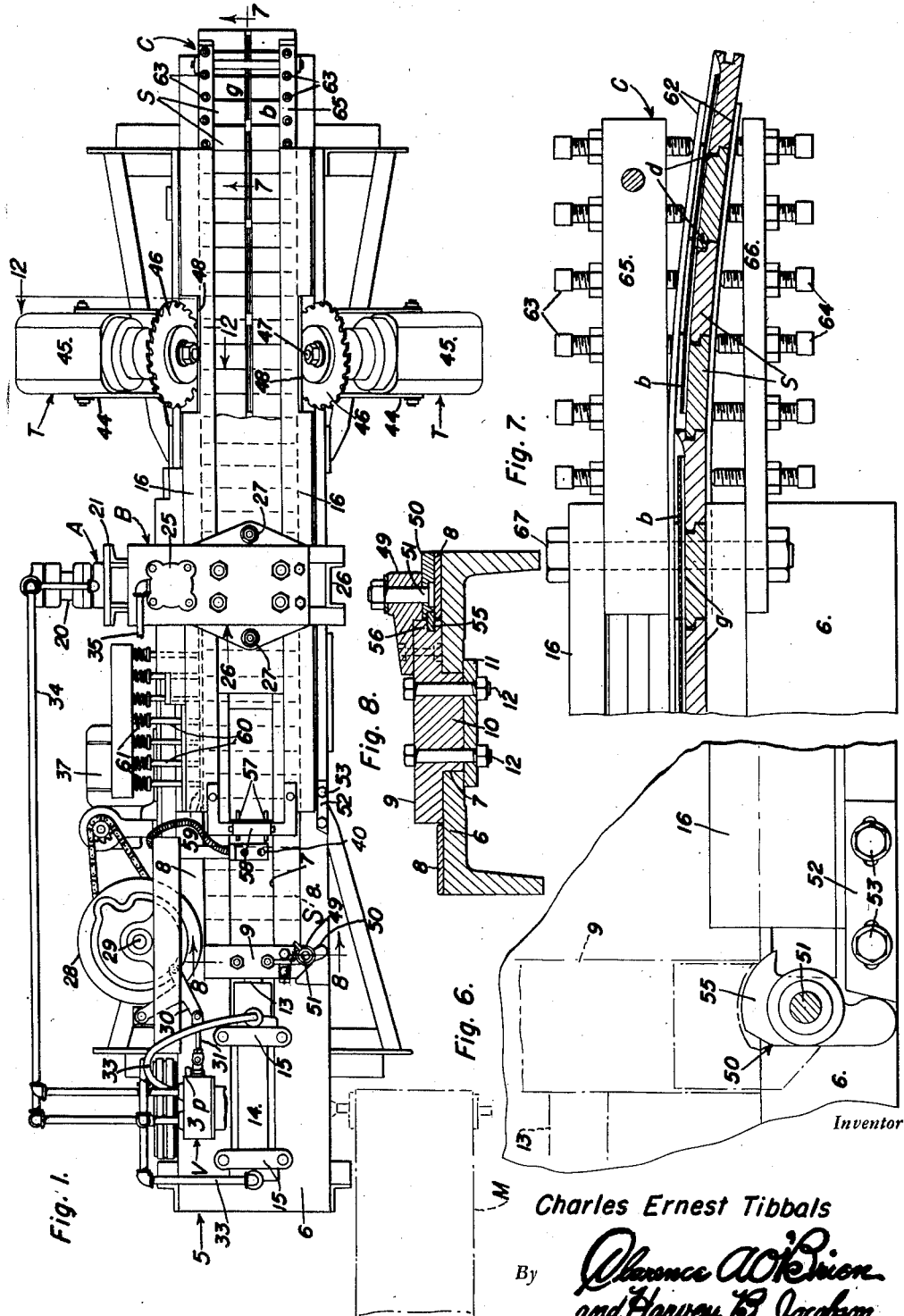
Inventor
Charles Ernest Tibbals
By
*Clarence A. O'Brien
and Harvey B. Jacobson*
Attorneys Sept. 1, 1953  C. E. TIBBALS  2,650,627
SPLINE AFFIXING DEVICE FOR PARQUETRY BLOCKS
Filed Jan. 31, 1950  5 Sheets-Sheet 2

Inventor
Charles Ernest Tibbals
By Clarence A. O'Brien
and Harvey B. Jacobson
Attorneys Sept. 1, 1953 C. E. TIBBALS 2,650,627
SPLINE AFFIXING DEVICE FOR PARQUETRY BLOCKS
Filed Jan. 31, 1950 5 Sheets-Sheet 3
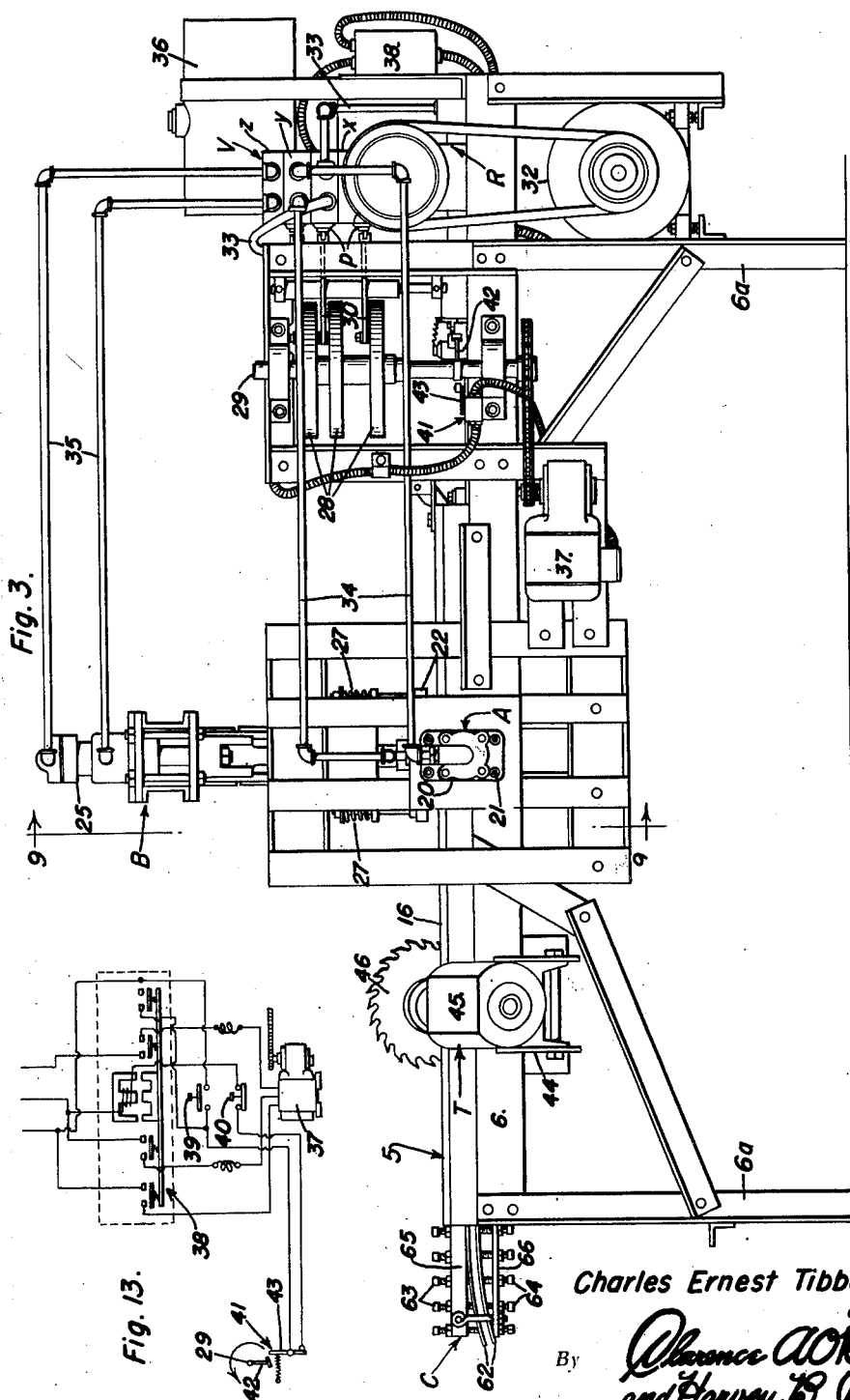
Inventor
Charles Ernest Tibbals Sept. 1, 1953  C. E. TIBBALS  2,650,627
SPLINE AFFIXING DEVICE FOR PARQUETRY BLOCKS
Filed Jan. 31, 1950  5 Sheets-Sheet 4
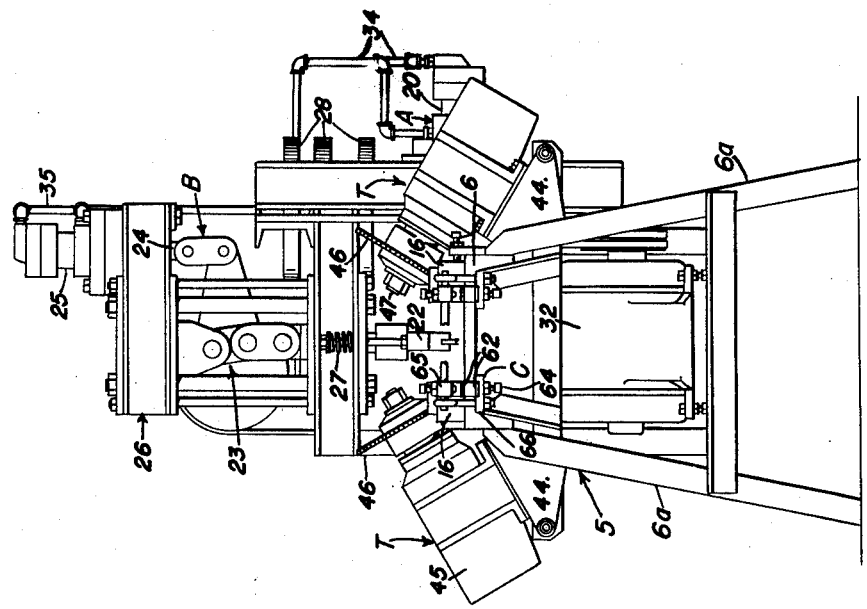
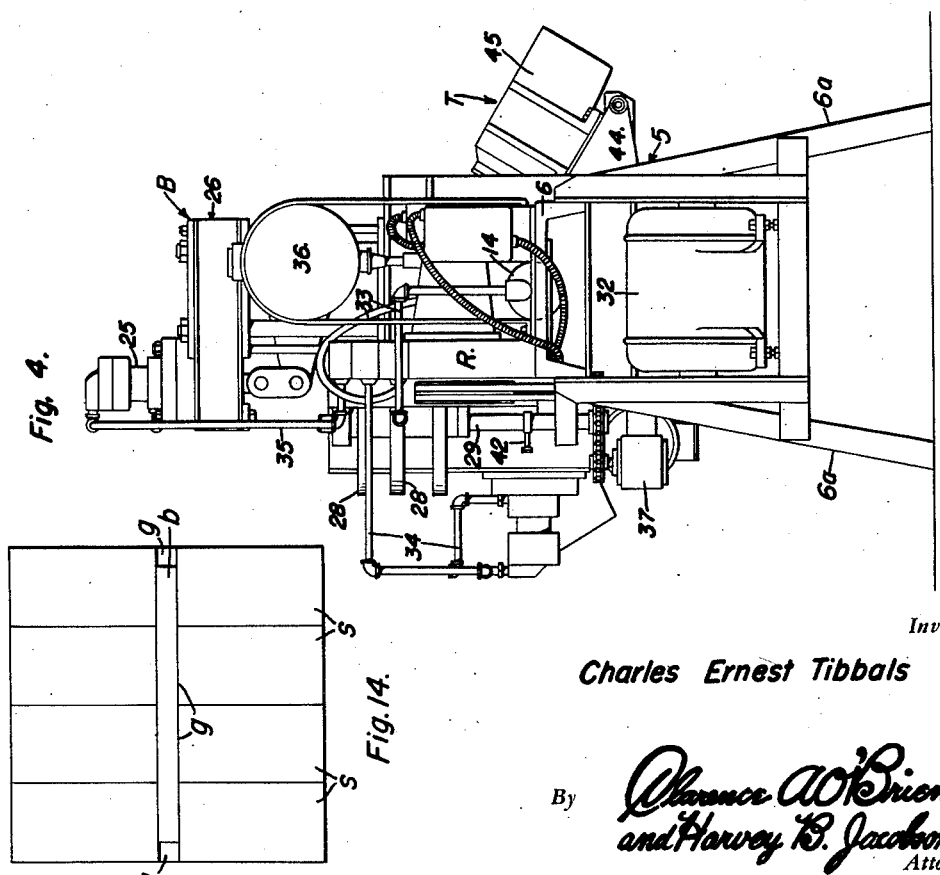
Inventor
Charles Ernest Tibbals
By *Clarence A. O'Brien and Harvey B. Jacobson*
Attorneys Sept. 1, 1953  C. E. TIBBALS  2,650,627
SPLINE AFFIXING DEVICE FOR PARQUETRY BLOCKS
Filed Jan. 31, 1950  5 Sheets-Sheet 5

Inventor
Charles Ernest Tibbals

By *Clarence A. O'Brien and Harvey B. Jacobson*
Attorneys

Patented Sept. 1, 1953

2,650,627

UNITED STATES PATENT OFFICE 2,650,627

SPLINE AFFIXING DEVICE FOR PARQUETRY BLOCKS

Charles Ernest Tibbals, Oneida, Tenn., assignor of fifty per cent to A. Todd Tibbals, Columbus, Ohio Application January 31, 1950, Serial No. 141,557

4 Claims. (Cl. 144—2)

This invention relates to the manufacture of parquetry blocks by splining a plurality of slats or short pieces of tongued and grooved flooring together and delivering them as completed parquetry blocks or units. The slats or flooring pieces are assembled bottom up and in interfitting relation upon a flat bed between guide rails and moved intermittently along said bed to an alining and spline-affixing station where a suitable device accurately alines the ends of the slats or flooring pieces. As the slats or flooring pieces are thus moved, a spline is placed in the spline grooves of each set of the slats or flooring pieces required to make a block or unit. As soon as the slats or flooring pieces of each set are accurately alined, suitable plunger means flattens the spline in the spline grooves thereof to affix the spline to said slats or flooring pieces and produce a block or unit. This operation is continued to produce successive blocks or units and move them to and through a curving device in a downwardly curved path. In moving through the curving device, the blocks or units and their splines are flexed so that the slats of said blocks or units are spread apart at the bottom to provide V-shaped grooves between them. When the blocks or units are delivered from the curving device, the splines spring back to straight form and return the blocks to flat form so as to change the grooves into hair line cracks, whereby when the blocks are laid there will be no buckling of the floor on account of expansion of the slats due to moisture absorption.

An object of the invention is to provide a machine that takes in pieces of flooring positioned edge to edge, and that, after a spline is placed in spline grooves of each set of flooring pieces required to form a block, performs appropriately timed operations on the flooring pieces and splines and delivers completed parquetry blocks or units in which hair line cracks are provided between the flooring pieces thereof.

A further object is to provide an improved method of making parquetry blocks having hair line cracks between the flooring pieces thereof.

Another object is to provide novel and efficient means to cut away the tongues at a corner of one flooring piece of each set as said flooring pieces are moved toward an alining and spline affixing station, so that each block will have the tongues cut away at one corner thereof as disclosed in the patent to Fetz, No. 1,778,069, October 14, 1930.

Still another object is to provide a novel and efficient means for trimming the bottom corners of the blocks at the ends of the slats thereof as said blocks are moved from the spline-affixing station to the block curving device.

A machine embodying the present invention includes a work table having an elongated bed provided with guide rails and on and near one end of which the slats, previously cut to predetermined length and provided in their bottom faces with transverse spline grooves, are placed by hand bottom up and in interfitting relation crosswise of said bed and between the guide rails. The slats are intermittently moved along the bed, for a distance equal to the combined widths of the number of slats in a set required to make one block, by means of a pusher bar actuated by the piston of a double-acting reciprocating hydraulic motor, and that number of slats are placed on the bed directly in front of the pusher bar each time the latter is retracted. The piston of said motor has a stroke of a length slightly greater than the aforesaid distance so that the successive sets of slats may be readily placed on the bed with the first slat of each set interfitted with the last slat of the next preceding set and with a slight space left between the last slat of the first-mentioned set and the pusher bar. Thus, the pusher bar moves a short distance to engage said last slat of the first-mentioned set and then completes its stroke to move the entire line of slats along the bed for the required distance. The sets of slats are thus ultimately successively moved to an alining and spline-affixing station located about midway the length of the table, and when movement of the slats ceases, a device is actuated to accurately aline the slats of the set positioned at said station and then another device is actuated to affix the spline of such set of slats to the latter. The alining and spline-affixing devices are actuated by the pistons of double-acting reciprocating hydraulic motors, and the hydraulic motors of the pusher bar, the alining device and the spline-affixing device are controlled by a multiple valve including a valve unit for controlling each hydraulic motor which embodies a valve piston movable from a closed position in one direction to cause projection of the piston rod of said motor and in the opposite direction to cause retraction of said piston rod, and then movable back to closed position to leave the piston rod retracted. Cam means is provided to thus move or actuate the valve piston of each valve unit each time such cam means is operated. The cam actuating means for the several valve units are simultaneously operated by an electric motor, and they are relatively arranged so as to successively function for first causing one reciprocation of the pusher bar, then one operation of the alining device, and then one operation of the spline-affixing device. The electric motor is controlled by a starter including an electromagnetically operated switch unit and a control means therefor including a normally open manually closed start switch and a normally closed combined stop and reset switch momentarily automatically opened, upon completion of each operation of the spline-affixing device, by a rotatable arm actuated by the electric motor. Thus, the machine is automatically rendered inoperative immediately after each operation of the spline-affixing device, and can only be manually rendered operative again by momentarily closing the start switch. This enables the operator to take ample time to properly place a set of the slats on the bed before the pusher bar is again actuated, as well as ample time to place a spline in the spline grooves of said slots. From the alining and spline-affixing station, the blocks are moved between power driven cutter disks arranged to trim the bottom corners of the blocks at the ends of the slats thereof. The blocks are then successively moved through and discharged from a curving device, provided at the other end of the machine, whereby cracks are produced between the slats of each block. Thus, the machine performs, under manual control, certain successive operations in such timed relation as to rapidly produce strong and accurately assembled parquetry units.

The exact nature of the present invention, as well as other objects and features thereof, will be apparent from the following description when considered with the accompanying drawings, in which:

Figure 1 is a top plan view, partly broken away, of a machine embodying my invention.

Figure 3 is a rear elevational view of the same.

Figure 4 is an end elevation looking toward the receiving end of the machine.

Figure 5 is an end elevation looking toward the delivery end of the machine.

Figure 6 is an enlarged fragmentary view, partly in plan and partly in section, showing the corner cutter engaged with the actuating abutment therefor.

Figure 7 is an enlarged fragmentary vertical longitudinal section taken through the curving device on the line 7—7 of Figure 1.

Figure 8 is an enlarged transverse section taken on the line 8—8 of Figure 1.

Figure 13 is a diagrammatic view illustrating the circuit connections for the starter which controls the operating motor for the cam actuating means of the valve units.

Figure 14 is an enlarged plan view of one of the blocks with the spline affixed therein.

Figures 2, 12:
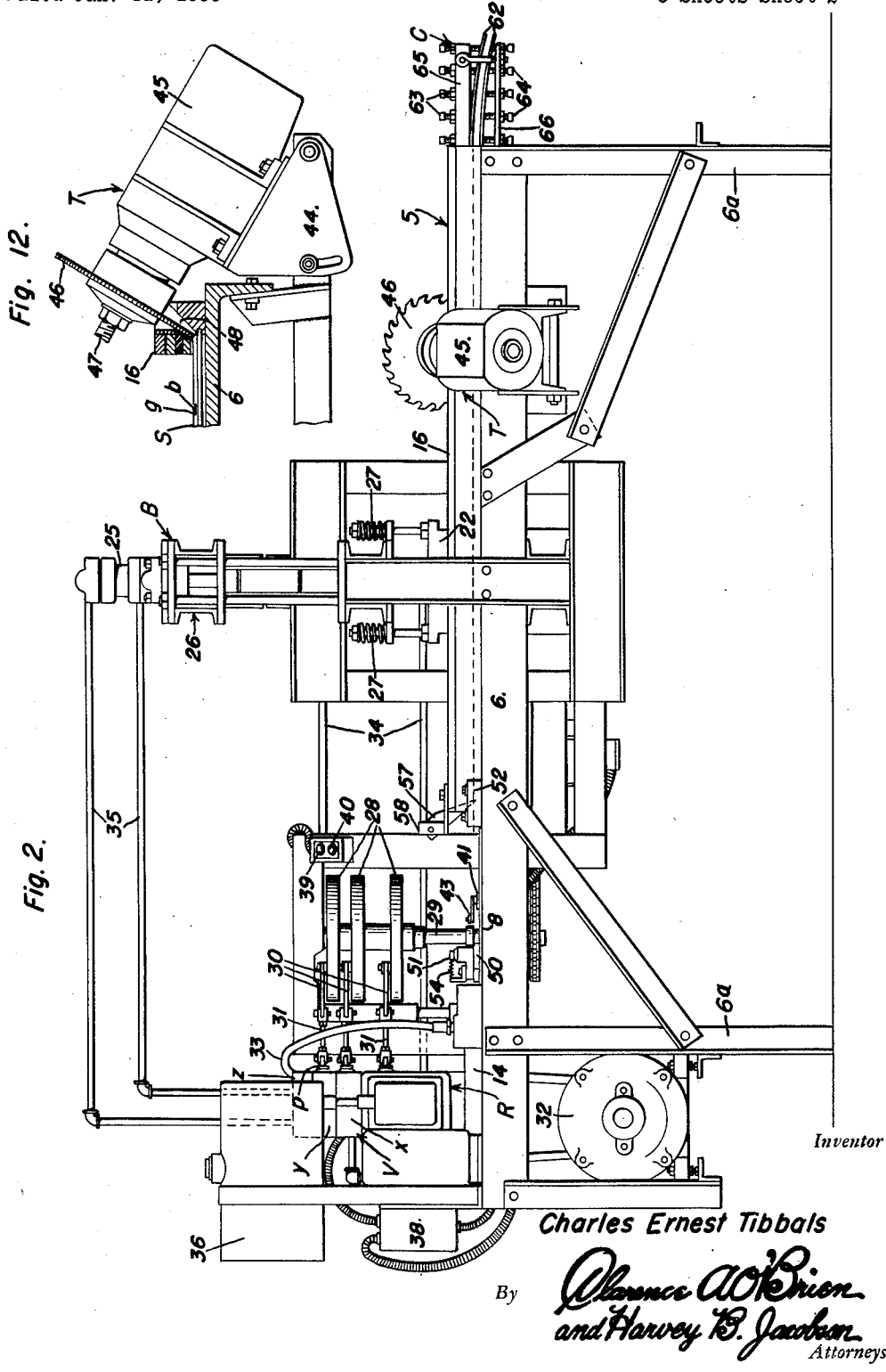
Figure 2 is a front elevational view thereof.
Figure 12 is an enlarged fragmentary section through the machine at one of the motor operated cutters for trimming the bottom corners of the blocks, taken on the line 12—12 of Figure 1.
Figure 10:
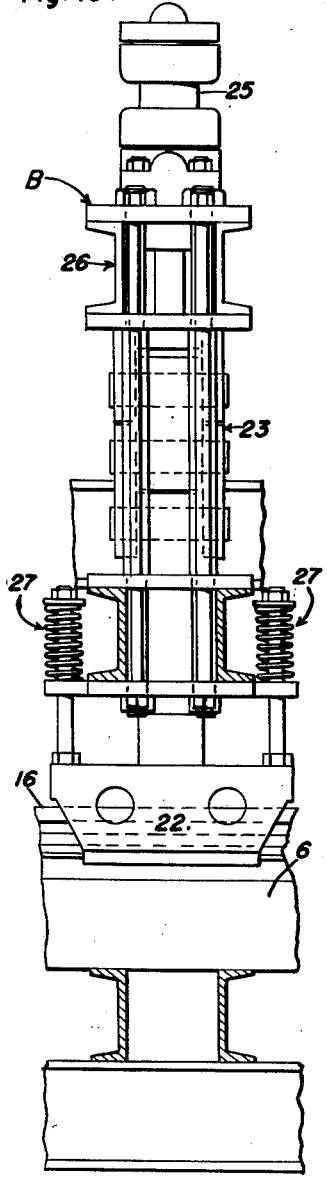
Figure 10 is a section taken on the line 10—10 of Figure 9.

Referring in detail to the drawings, 5 indicates a work table having an elongated bed or top 6 mounted on legs 6a and provided near one end with a longitudinal slot 7 and at opposite sides of said slot with flat longitudinal guide rails 8. A transverse pusher bar 9 is slidable on the bed 6 between the rails 8 and has a guide rib 10 slidable in the slot 7 (Fig. 8). A plate 11 is bolted at 12 to the bottom of rib 10 and spans the slot 7 to hold the pusher bar 9 down on the bed. Pusher bar 9 is fixed to the projecting end of the piston rod 13 of a double acting reciprocating hydraulic motor whose cylinder 14 is rigidly mounted as at 15 longitudinally of the bed and in the outer end portion of the slot 7 thereof. Angular combined hold-down and guide rails 16 are secured on the bed 6 and extend along opposite sides of the latter from the guide rails 8 to the other end of said bed.

Figure 9:
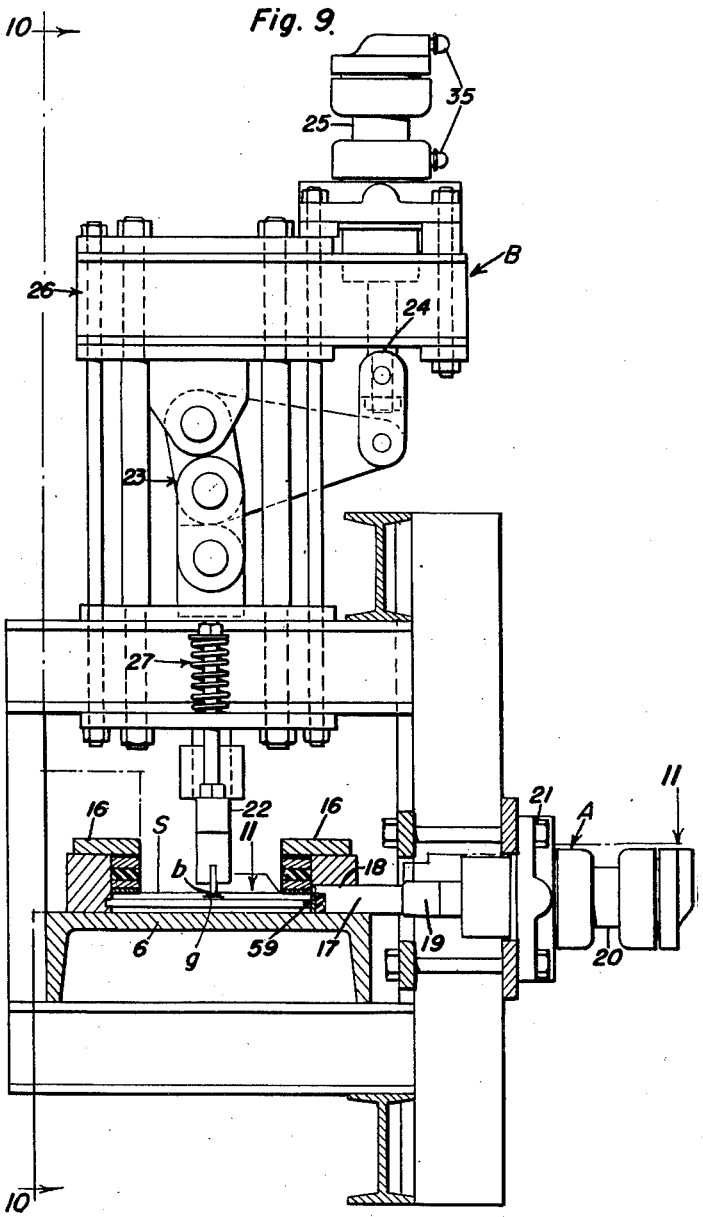
Figure 9 is an enlarged vertical transverse section taken on the line 9—9 of Figure 3.
Figure 11:
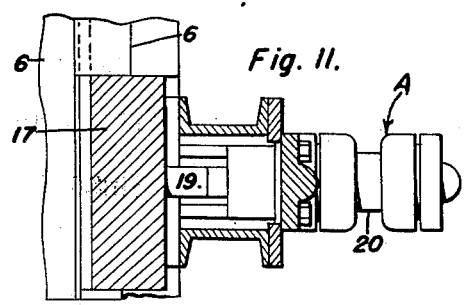
Figure 11 is a fragmentary section taken on the line 11—11 of Figure 9.

About midway the length of the bed is a slat-alining and spline-affixing station, at which are mounted a slat-alining device A and a spline-affixing device B. The device A includes an alining plate 17 slidable transversely of the bed 6 through a slot 18 provided in one of the rails 16 in position to push against the adjacent ends of that number of slats S required to make one parquetry block, and to thereby force the opposite ends of such slats against the opposed rail 16 to accurately aline said slats at their ends and to accurately aline the transverse spline grooves g thereof. The alining plate 17 is fixed to the projecting end of the piston rod 19 (Fig. 9) of a double-acting reciprocating hydraulic motor whose cylinder 20 is mounted on the table as at 21 at one side of the bed 6.

The spline-affixing device includes a vertically movable flattening plunger 22 having a power-multiplying toggle link and lever operating connection 23 to the piston rod 24 of a double-acting reciprocating hydraulic motor whose cylinder 25 is mounted on a superstructure 26 over the bed 6. Spring devices 27 are provided to assist in elevating the plunger 22 so that the motor including cylinder 25 may be of minimum power. This type of spline-affixing device is broadly old as shown in the Twyman patent, No. 2,247,140, June 24, 1941, and in the Rhinevault patent, No. 1,859,633, May 24, 1932, and the splines b which are used are separately pre-formed for placement in the spline grooves of the slats and are conventional as disclosed in the latter patent.

The hydraulic motors for the pusher bar 9, the slat alining plate 17 and the spline affixing plunger 22 are controlled by a multiple valve V of the type shown in the Berglund patent, No. 2,289,567, July 14, 1942, said valve including a valve unit x for controlling the motor of pusher bar 9, a valve unit y for controlling the motor of alining plate 17, and a valve unit z for controlling the motor of plunger 22. Each valve unit includes a valve piston p movable in one direction to effect projection of the piston rod of the associated motor, and movable in the opposite direction to effect retraction of said piston rod, as well as having an intermediate closed position to which it may be moved to leave the piston rod retracted.

Cam means is provided to thus move the valve piston p of each valve unit each time such cam means is operated, and each cam means includes a cam disk 28 secured on a vertical shaft 29 journaled on and arranged at one side of the table 5 near the end where pusher bar 9 is located, a lever 30 having a roller riding in the cam groove of said cam disk and a link 31 connecting said lever to said valve piston. The valve units control passage of pressure fluid to and from a pump and reservoir unit R, whose pump is driven by an electric motor 32, and to and from the opposite ends of the cylinders 14, 20 and 25 respectively through pipe lines 33, 34 and 35. A second reservoir 36 is connected to the reservoir of unit R to provide a reserve supply of liquid for the hydraulic system. The cam disks 28 are arranged so as to successively move the valve pistons $p$ of the units $x$, $y$ and $z$ in the order named and in the manner stated above upon each rotation of shaft 29. Shaft 29 is driven by a polyphase alternating current motor 37 controlled by a starter including an electromagnetically operated switch unit 38 of the type shown in the Rosing et al. patent, No. 2,261,632, November 4, 1941, a start push button 39, a combined stop and reset push button 40, and a normally closed combined stop and reset switch 41 arranged to be momentarily automatically opened each time the shaft 29 is rotated and upon completion of each operation of the spline flattening plunger 22, by means of an arm 42 secured on the shaft 29 in position to actuate the operating arm 43 of said switch 41. The push button 40 is only used in an emergency, and the switch 41 normally performs the same function automatically. Otherwise, the diagram of Figure 13 and the manner in which the starter functions are generally described in connection with Figure 14 of the Rosing et al. patent, and need not be explained herein. Tools T for trimming the bottom corners of the blocks at the ends of the slats after said blocks leave the spline-affixing device, are mounted on the table as at 44 at opposite sides of the bed 6, each of said tools including an electric motor 45 disposed and set at an outward inclination, and a disk cutter 46 secured on the inwardly projecting drive shaft 47 of said motor and projecting at the bottom through a slot 48 provided in the adjacent rail 16.

Fixed to one end of the pusher bar 9 is a bracket 49, and an oscillatory cutter 50 is pivoted at 51 between its ends to the under side of a laterally projecting end of said bracket. An adjustable abutment bar or member 52 is bolted at 53 on the bed 6, in position to engage the outer end of cutter 50 as the pusher bar 9 approaches the end of its operative stroke and to thereby swing said cutter in an arcuate path and in a clockwise direction to cut away the tongues at one corner of the rear or last slat of each set of slats placed on the bed, whereby the tongues will be cut away at one corner of each block subsequently produced by splining the set of slats together. This is done as and for the purpose explained in the above-mentioned Fetz patent. The cutter 50 is swung back to its normal position by a spring 54 (Fig. 2) as said cutter is disengaged from the abutment bar 5 when the pusher bar 9 is retracted. The blade 55 of cutter 50 moves in a groove 56 provided in an end of pusher bar 9, and a wall of said groove acts as a stop to limit backward swinging of the cutter by spring 54 to the position of Figure 1. Suitable dogs 57 (Figs. 1 and 2) may be mounted as at 58 over the bed 6 in advance of the spline affixing device to engage the slats and prevent any backward movement thereof from vibration.

A flexible alining strip 59 may be suitably disposed and held in front of the alining plate 17 within the adjacent rail 16, as well as inwardly of a series of transverse plungers 60 which are arranged in advance of the plate 17. These plungers 60 are pressed inwardly by springs 61 against the strip 59 to cause the latter to roughly aline the slats in advance of accurate final alining thereof upon actuation of the plate 17.

At the end of bed 6 remote from the pusher bar 9, a curving device C is mounted. The blocks are moved through this curving device in a downwardly curved path as shown in Fig. 7, and are then delivered from the machine. In moving through this curving device, the blocks are curved and their splines are flexed so as to spread the slats of each block apart at the bottom to provide V-shaped grooves $d$ between them as generally disclosed but performed in a different way in the Bruce patent, No. 2,113,076, April 5, 1938. When the blocks are delivered from this curving device, the splines spring back to straight form and return the blocks to flat form so as to change the grooves into hair line cracks as and for the purpose previously stated. The device C may include pairs of flexible curving strips 62 between which the opposite edge or marginal portions of the blocks are guided. The curvature of each pair of the strips 62 is adjusted and secured by the respective series of set screws 63 and 64 passing through bars 65 and 66 bolted at 67 to the rails 16 and the bed 6.

The slats S may be supplied by the delivery apron M (Fig. 1) of a cutting-off and grooving machine which cuts off the ends of odd-length pieces of flooring to produce slats of uniform length, and which forms a transverse spline groove in the bottom face of each slat midway between the ends thereof. An operator takes the number of slats required for one block from the apron M and places this set of them bottom up and in interfitted relation on and crosswise of the bed 6 in front of the pusher bar 9 and between the rails 8. The operator then pushes the button 39 to place motor 37 in operation and drive the shaft 29. This causes rotation of cam disks 28 to successively operate the valve units $x$, $y$ and $z$ in the order named. When valve unit $x$ is operated, the pusher bar 9 is first projected to move or feed the slats a distance toward the alining and spline-affixing station slightly greater than the combined widths of the slats of the set, and to then retract and leave the pusher bar 9 in retracted position. It can be assumed that there are several sets of the slats on the bed 6, and that when the pusher bar 9 was projected, a set of the slats was moved to the aforesaid station, roughly alined by the action of plungers 60 and having a spline $b$ previously placed in the spline grooves $g$ thereof by the operator. The valve unit $y$ is then operated by its cam actuating means to first project the plate 17 and accurately aline the slats of the set while at rest at the said station, and to then retract and leave the plate 17 in retracted position. The valve unit $z$ is then operated to first cause the plunger 22 to be forced down for flattening the spline of such set of slats at the said station, thereby affixing the spline to these slats and forming a flat block, and to then elevate and leave the plunger 22 elevated. These operations occur in slightly less than one complete rotation of shaft 29, whereupon arm 42 momentarily opens the switch 41 and de-energizes the motor 37, which, after drifting slightly, comes to a stop. The above cycle of operation is repeated as long as desired, and the blocks are thereby intermittently moved along to be successively trimmed by the tools T, curved by the device C, and discharged from the machine, as previously explained.

From the above description, the construction, operation and advantage of the invention will be apparent to and appreciated by those skilled in the art. Changes in the form and in the details of the invention as shown and described, are contemplated within the spirit of the invention as claimed.

What is claimed as new is:

1. In a parquetry manufacturing machine having means for successively feeding blocks of parquetry from the bed of the machine, means temporarily flexing the successive blocks immediately preceding ejection from the bed so as to spread the flooring pieces of each block apart at the bottom to provide V-shaped grooves between the pieces and to flex the spline joining the pieces whereby the block will return to flat form due to the resiliency of the spline, thereby changing the V-shaped grooves between the pieces into hairline cracks, said means being mounted on the ejection end of said bed and including pairs of vertically spaced strips engaging the tops and bottoms of the blocks at opposite sides thereof, said strips being resilent for flexing to correspondingly curve the same and provide between the strips of the pairs arcuate paths in which said sides of the blocks slide during feeding of the blocks, and means on opposite sides of the machine adjustable into engagement with said strips to flex and curve the same.

2. In a parquetry manufacturing machine having means for sucessively feeding blocks of parquetry from the bed of the machine, means temporarily flexing the successive blocks immediately preceding ejection from the bed so as to spread the flooring pieces of each block apart at the bottom to provide V-shaped grooves between the pieces and to flex the spline joining the pieces whereby the block will return to flat form due to the resiliency of the spline, thereby changing the V-shaped grooves between the pieces into hairline cracks, said means being mounted on the ejection end of said bed, and said means including a pair of flexible guide strips carried by each side of the bed of the machine, means adjustably supported by the bed of the machine and engaging said strips of each pair for maintaining the same in spaced relation and providing an arcuate path for the blocks.

3. In a parquetry manufacturing machine having means for successively feeding blocks of parquetry from the bed of the machine, means temporarily flexing the successive blocks immediately preceding ejection from the bed so as to spread the flooring pieces of each block apart at the bottom to provide V-shaped grooves between the pieces and to flex the spline joining the pieces whereby the block will return to flat form due to the resiliency of the spline, thereby changing the V-shaped grooves between the pieces into hairline cracks, said means being mounted on the ejection end of said bed, and said means including a pair of flexible guide strips carried by each side of the bed of the machine, means adjustably supported by the bed of the machine and engaging said strips of each pair for maintaining the same in spaced relation and providing an arcuate path for the blocks, said last recited means including a plurality of longitudinally spaced set screws adjustably carried by the bed of the machine above and below each pair of guide strips for engagement therewith.

4. In a parquetary block machine, a bed adapted to receive a plurality of flooring pieces assembled bottoms up and having transverse spline grooves in their bottoms, a hydraulically operated spline-affixing device for expanding a laterally expansible spline positioned in said grooves to interlock its edges with the walls of said groove and form a block, said spline-affixing device being carried by said bed and overlying the spline grooves, a hydraulically operated feeding device for intermittently feeding the flooring pieces to said spline-affixing device with their edges transverse to the direction of feed, valve units operatively connected with said feeding device and spline-affixing device, respectively, and operative to cause operation of said devices, rotary cam means operatively connected to said valve units to operate the valve connected with said feeding device and said spline-affixing device successively in the order named, an electric motor connected to said cam means to rotate the same, and means including a normally open manually closed switch to render and keep the motor operative until one operation of the feeding device and one operation of the spline-affixing device have been completed, and a second normally closed switch and an element driven by said motor to open said second switch to automatically render and keep the motor inoperative after each operation of the spline-affixing device and until the first switch is manually closed again.

CHARLES ERNEST TIBBALS.

References Cited in the file of this patent

UNITED STATES PATENTS

| Number | Name | Date |
|---|---|---|
| 707,116 | Johnson | Aug. 19, 1902 |
| 1,471,246 | Daniels | Oct. 16, 1923 |
| 1,812,601 | Melling | June 30, 1931 |
| 1,859,633 | Rhinevault | May 24, 1932 |
| 2,038,000 | Parker | Apr. 21, 1936 |
| 2,038,510 | Goff | Apr. 21, 1936 |
| 2,113,076 | Bruce | Apr. 5, 1938 |

FOREIGN PATENTS

| Number | Country | Date |
|---|---|---|
| 478,397 | Great Britain | Jan. 18, 1938 |